United States Patent [19]
Andersson

[11] Patent Number: 5,860,457
[45] Date of Patent: Jan. 19, 1999

[54] GASOLINE VAPOR RECOVERY SYSTEM AND METHOD UTILIZING VAPOR DETECTION

[75] Inventor: Bo-Göran Andersson, Austin, Tex.

[73] Assignee: Dresser Industries, Dallas, Tex.

[21] Appl. No.: 554,763

[22] Filed: Nov. 7, 1995

Related U.S. Application Data

[63] Continuation-in-part of Ser. No. 515,484, Aug. 15, 1995, Pat. No. 5,706,871.

[51] Int. Cl.⁶ .................................................. B65B 31/00
[52] U.S. Cl. ........................... 141/59; 141/4; 141/45; 141/47; 141/59; 141/104; 141/105; 141/290; 137/486; 137/625.41
[58] Field of Search ..................... 141/4, 45, 47, 141/59, 104, 105, 186, 192, 196, 285, 290, 302; 137/486, 625.41; 128/200.19

[56] References Cited

U.S. PATENT DOCUMENTS

| | | |
|---|---|---|
| 4,057,086 | 11/1977 | Healy . |
| 4,095,626 | 6/1978 | Healy . |
| 4,118,170 | 10/1978 | Hirt . |
| 4,508,127 | 4/1985 | Thurston . |
| 4,949,755 | 8/1990 | Thurston et al. . |
| 5,040,577 | 8/1991 | Pope . |
| 5,127,173 | 7/1992 | Thurston et al. . |
| 5,194,075 | 3/1993 | Matsuoka . |
| 5,269,353 | 12/1993 | Nanaji et al. . |
| 5,280,814 | 1/1994 | Stroh . |
| 5,305,807 | 4/1994 | Healy . |
| 5,323,817 | 6/1994 | Spalding . |
| 5,332,008 | 7/1994 | Todd et al. . |
| 5,332,011 | 7/1994 | Spalding . |

*Primary Examiner*—David J. Walczak
*Assistant Examiner*—Timothy L. Maust
*Attorney, Agent, or Firm*—Haynes and Boone, L.L.P.

[57] ABSTRACT

A gasoline vapor recovery system and method in which a flow metering unit is provided for measuring the flow of a mixture of air and gasoline vapor from a vehicle tank and for determining the density of the gasoline vapor in the mixture. A value is provided for varying the flow of the mixture from the tank, and a control unit is operatively connected to the flow metering unit and to the valve for adjusting the position of the valve, and therefore the flow of the mixture from the tank, in response to the density of the gasoline vapor in the mixture and the gasoline flow.

53 Claims, 5 Drawing Sheets

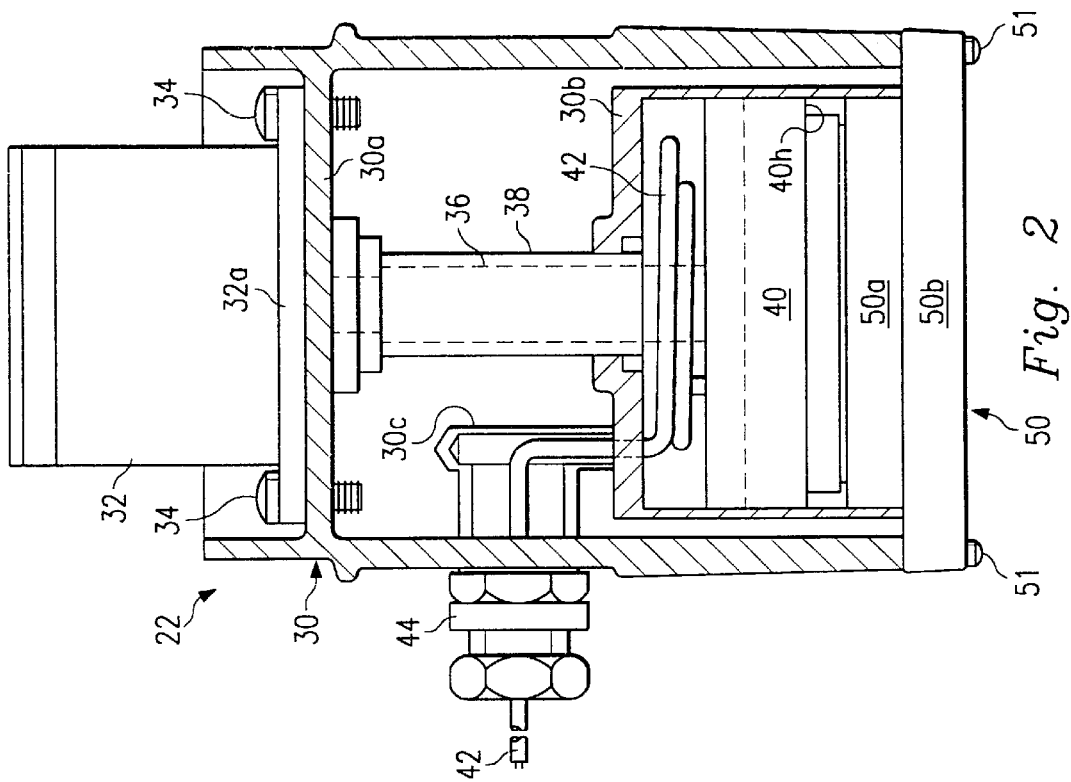
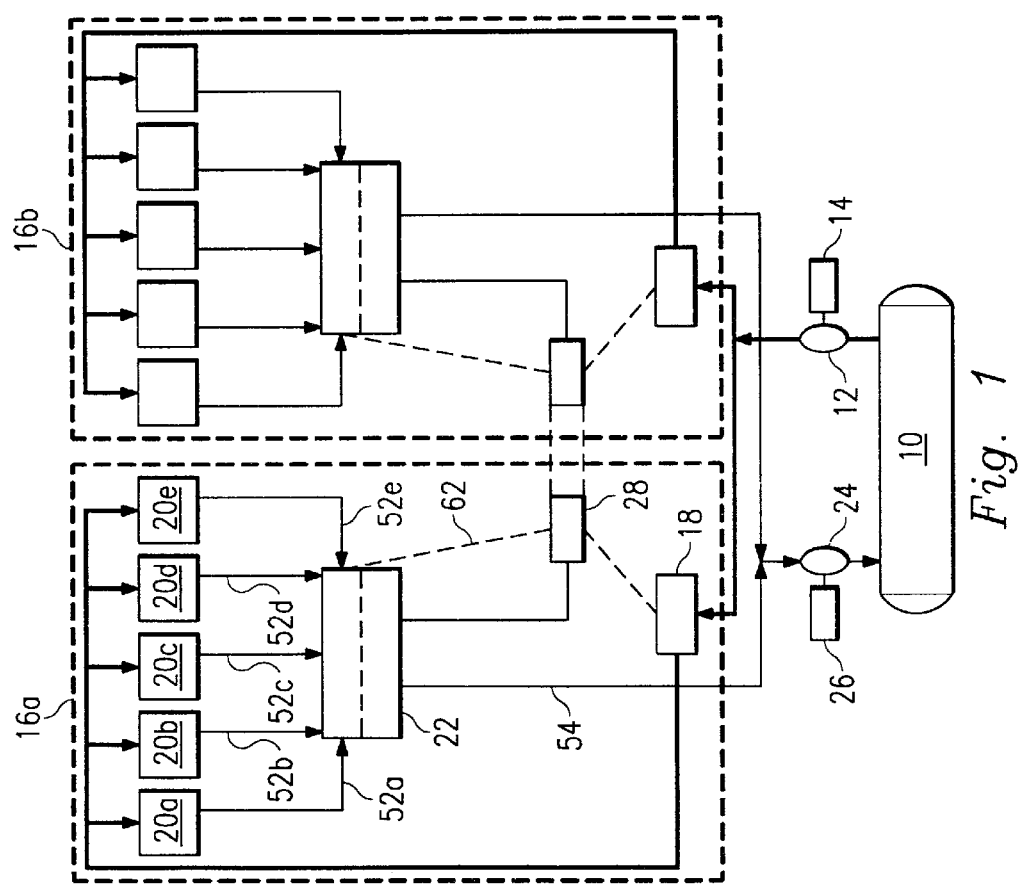

GASOLINE VAPOR RECOVERY SYSTEM AND METHOD UTILIZING VAPOR DETECTION

CROSS REFERENCE TO RELATED APPLICATION

This application is a continuation-in-part of application Ser. No. 08/515,484, filed on Aug. 15, 1995 now U.S. Pat. No. 5,706,871.

BACKGROUND OF THE INVENTION

This invention relates to a gasoline vapor recovery system and method and, more particularly, to such a system and method for controlling the flow of vapor from a container as it is being filled with gasoline.

The need for controlling the flow of vapor from a container, such as a vehicle tank, as it receives gasoline is well known. For example, a number of systems and methods have been proposed for controlling the flow of a mixture of air and hydrocarbon vapors (hereinafter referred to as "vapor/air mixture") displaced from a vehicle tank during refueling of the vehicle at a service station, or the like.

Previous gasoline dispensing and vapor recovery systems and methods of this type have included a plurality of dispensing nozzles at each dispensing area of the dispensing, or service, station, with each nozzle being adapted to dispense a different grade of gasoline. Passages are provided in each nozzle for collecting the vapor/air mixture from the fuel tank, and a return line communicates the vapor/air mixture passage for delivering the collected vapor/air mixture to the underground fuel storage tank. Although these designs have been generally successful in recovering a portion of the vapor/air mixture, they are not without problems.

For example, some of the earlier systems and methods relied solely upon vapor/air mixture pressure within the fuel tank to force the vapor/air mixture through the vapor/air mixture return line. However, due to pressure losses and partial obstructions in the vapor/air mixture recovery line (sometimes caused by fuel splashback or condensation), the vapor/air mixture pressure developed in the vehicle fuel tank was often insufficient to force the vapor/air mixture out of the vehicle tank and to the underground storage tank.

Other, more recent, vapor recovery systems employ a vacuum pump for drawing the vapor/air mixture from the vehicle tank and through a vapor/air mixture return line. To avoid the expense of a separate vacuum pump at each dispensing station, such systems have typically resorted to a powerful, continuously-operating vacuum pump and a complicated arrangement of electrically actuated valves for connecting the various vapor/air mixture return lines to the vacuum pump when the various pumps were actuated for dispensing. Acceptance of these designs has been minimal because of the expense and difficulty of both installation and maintenance. Additionally, since they typically draw such a large volume of ambient air relative to the volume of fuel vapor/air mixture, there is a danger of an explosive mixture being formed.

Also, it has been suggested that each dispensing unit include a vacuum pump driven by the dispensing unit's conventional gasoline flow meter and connected to a vapor/air mixture return line. However, this type of apparatus is limited to a linear relationship between gas flow and vapor/air mixture flow, which relationship is not always optimum, since the vapor/air mixture concentration in the return line is dependent on several parameters such as nozzle design, vehicle fill pipe design, weather conditions, wind, vehicle fuel tank temperature, fuel temperature, atmospheric pressure, etc. In apparatus designed to correct for this, a valve has been provided which is controlled by electronics that respond to the gasoline and the vapor/air mixture flow and establish an optimum relationship therebetween. However, this requires a metering device and a control valve for each dispensing nozzle, which is expensive and results in an unduly complicated apparatus. Moreover, in the latter arrangements, the vapor/air mixture metering device is disposed downstream of its associated control valve. Therefore, when the vapor/air mixture expands after leaving the control valve, it causes the operation of the metering device to be less than optimum.

These problems are compounded when the vehicle to be filled with gasoline has a system for removing the gasoline vapors from the vapor/air mixture during the fuel dispensing and vapor recovery operation. These systems are often referred to as "onboard refueling vapor recovery systems" and include a carbon canister, or similar device, through which the vapor/air mixture is passed, for purifying the mixture and venting it through a special vent line. However, since the vapor recovery system of the dispensing station is activated during the gasoline dispensing operation, atmospheric air is often drawn into the nozzle and passed to the gasoline underground storage tank. This causes undesirable pressurization of the tank as well as fugitive emissions both of which lowers the efficiency of the system.

SUMMARY OF THE INVENTION

It is therefore an object of the present invention to provide a system and method for recovering vapor from a tank as the tank is being filled with a fluid, in which the flow of the recovered vapor is controlled in response to one or more parameters.

It is a still further object of the present invention to provide a vapor recovery system and method of the above type in which the system can respond to the recovered vapor from the vehicle tank being in the form of pure air, or substantially pure air, and terminate, or significantly reduce, the flow of the recovered air to the underground storage tank.

It is therefore an object of the present invention to provide a vapor recovery system and method of the above type in which one meter/valve assembly meters and controls the flow of the fluid from multiple sources.

It is a further object of the present invention to provide a system and method of the above type in which the metering takes place upstream of the fluid control.

It is a still further object of the present invention to provide a system and method of the above type in which the amount of recovered vapor can easily be adjusted in response to various parameters.

It is still further object of the present invention to provide a system and method of the above type in which a single vapor/air mixture pump serves a plurality of gasoline dispensing nozzles for selectively drawing vapor/air mixture from the vehicle tank during the dispensing of gasoline into the tank.

It is a still further object of the present invention to provide a system and method of the above type in which the fluid or vapor/air mixture flow can be controlled in response to several other parameters such as nozzle design, vehicle fill pipe design, weather conditions, wind, vehicle fuel tank temperature, fuel temperature, atmospheric pressure, etc.

Towards the fulfillment of these and further objects, a gasoline vapor recovery system and method is provided in which a flow metering unit is provided for measuring the flow of the gasoline vapor/air mixture from a vehicle tank and determining the density of the gasoline vapor in the mixture. A valve is provided for varying the flow of the mixture from the tank, and a control device is operatively connected to the flow metering unit and to the valve for adjusting the position of the valve, and therefore the flow of the mixture from the tank, accordingly.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein:

FIG. 1 is a schematic view of the system of the present invention;

FIG. 2 is a sectional view of a meter/valve assembly forming a portion of the system of FIG. 1;

DESCRIPTION OF THE PREFERRED EMBODIMENT

Figure 3:
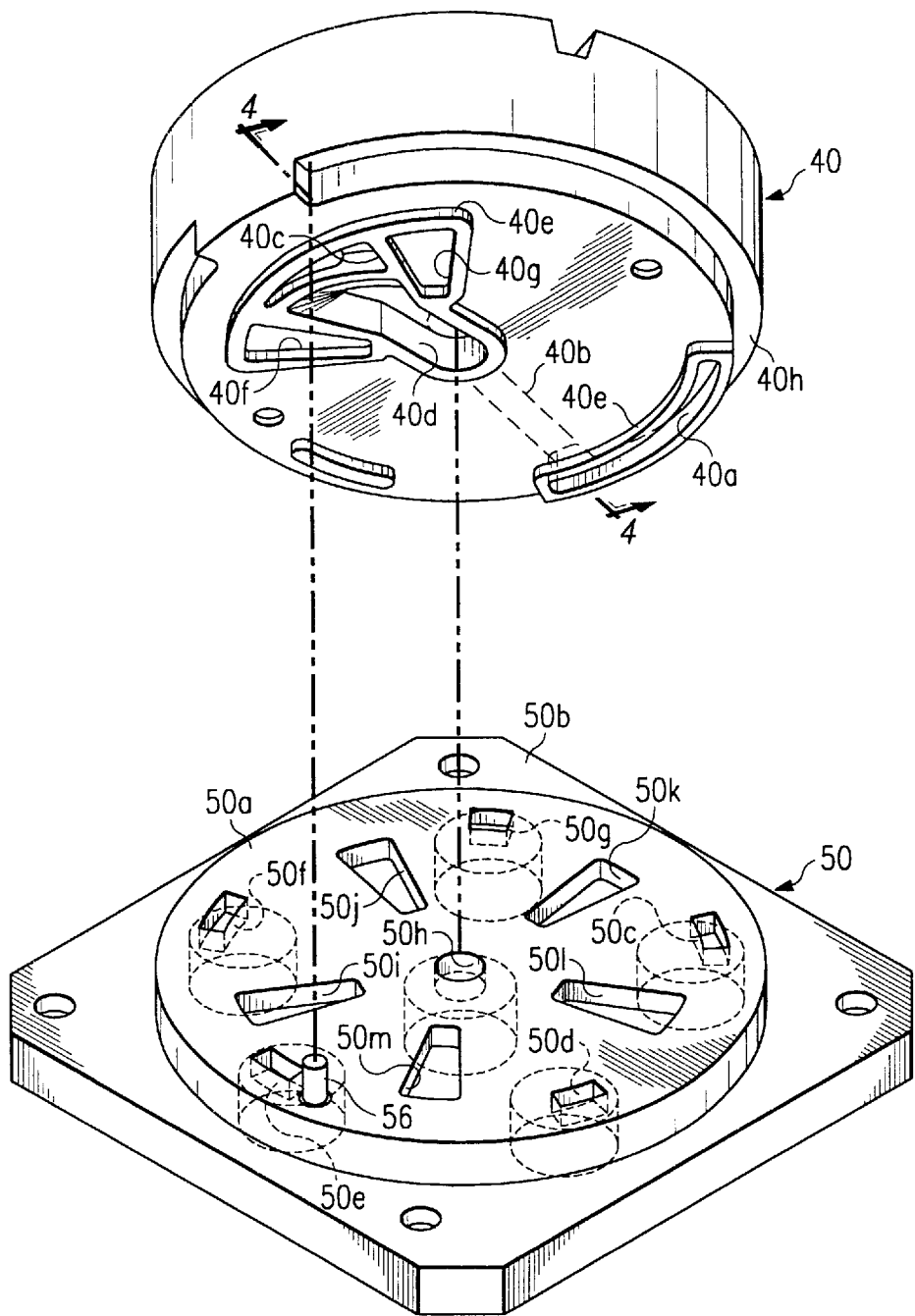
FIG. 3 is an exploded, perspective view of the meter/valve assembly of FIG. 2.

Referring to FIG. 1 of the drawings, the fluid control apparatus and method of the present invention will be described, by way of example, in connection with a gasoline dispensing and vapor recovery system at a vehicle service station. The reference numeral 10 refers to an underground gasoline storage tank, which is connected by a suitable conduit to a pump 12 driven by a motor 14 for pumping the gasoline to two dispensing stations 16a and 16b respectively represented by the dashed lines in the drawing. Since the stations 16a and 16b are identical, only the station 16a will be described in detail. A gasoline flow meter 18 receives the gasoline from the pump 12 and generates an output signal in proportion to the gasoline flow, for reasons to be described.

The dispensing station 16a includes five dispensing units 20a–20e for five different types, or grades, of gasoline and since the units are conventional, they are shown only schematically in the drawing. It is understood that each unit 20a–20e includes a dispenser housing for containing the necessary gasoline dispensing and vapor recovery components, including those to be described. Also, a blending chamber or valve can be included to regulate the volumetric ratio of a relative low octane products, such as unleaded regular, and relatively high octane products, such as unleaded premium, so as to make available multiple grades of fuel. In this context, although only one storage tank 10 is shown in the drawings, it is understood that two or more tanks would be provided, each containing a different grade or type of fuel, and that proper valving would be included to pass the two or more fuels to the above-mentioned blending chamber or valve. This blending technique does not form a part of the present invention and is disclosed in U.S. Pat. Nos. 3,424,348; 3,838,797 and No. 4,049,159, all of which are hereby incorporated by reference.

Although not shown in the drawings, it is understood that each unit 20a–20e also includes a hose and nozzle assembly which includes a twin hose arrangement of either two separate hoses or a coaxial arrangement in which inner and outer hoses are connected to a single dispensing nozzle for dispensing the blended product through one of the hoses and for receiving a vapor/air mixture from the vehicle tank in the other hose, as will be described.

The station 16a also includes a meter/valve assembly 22 which is selectively connected to each of the units 20a–20e. As will be described in detail later, the assembly 22 includes a valve unit and a member which cooperates with the value unit to control the fluid flow through the assembly and which contains a flowmeter. The vapor/air mixture is forced from the vehicle tank by the gasoline entering the tank and passes through the vapor/air mixture recovery hose associated with the selected unit 20a–20e, and through the assembly 22. A vacuum pump 24 is connected between the assembly 22 and the storage tank 10 for assisting in returning the captured vapor/air mixture to the tank. The pump 24 is conventional and is driven by a motor 26.

It is understood that suitable piping, conduits, valves, and the like, can be provided to accommodate the above described gasoline flow, which is shown by the relatively heavy lines in FIG. 1, and the vapor/air mixture flow, shown by the relative light lines.

A control unit 28 is provided in association with both of the stations 16a and 16b, receives electrical input signals from the gasoline flow meter 18 and from the assembly 22, and generates an output signal which is transmitted to the valve portion of the assembly 22 to operate the assembly, all in a manner to be described. The electrical connections between the control unit 28 and the flow meter 18 and the assembly 22 are shown by dashed lines in the drawing.

It should be emphasized that since FIG. 1 is merely a schematic representation of the basic components of the assembly of the present invention, the exact location of the components can vary within the scope of the invention. For example, the vapor/air mixture pump 24 and the motor 26 are not necessarily located adjacent the storage tank 10 but could be located in the dispensing station 16a.

The meter/valve assembly 22 is shown in FIG. 2 and includes a housing 30 having a platform 30a formed therein. A stepper motor 32 extends through the top of the housing 30, has a base portion 32a which rests on the platform 30a and is attached to the housing by four threaded bolts, two of which are shown by the reference numeral 34. A drive shaft 36 extends downwardly from the motor 32, as viewed in FIG. 2, and through the upper wall of a subhousing 30b formed in the lower portion of the housing 30. The drive shaft 36 extends within, and is supported by, a tubular support member 38 which also extends from the motor 32 and through the upper wall of the subhousing 30b.

A disc-like, body member 40, having a stepped outer diameter, is disposed in the subhousing 30b. The distal end of the output shaft 36 is connected to the center portion of the member 40 and a planetary gear, or the like (not shown), is provided for rotating the drive shaft 36 in response to actuation of the motor 32 in a conventional manner, with this rotation causing corresponding rotation of the member 40.

An electrical signal-conducting cable 42 extends from the member 40, through the upper wall of the subhousing 30b, through a molded conduit 30c formed in the housing 30 and through the wall of the latter housing. A stress-relieving nut assembly 44 is provided on the outer portion of the wall of the housing 30 which receives and protects the cable 42. The cable 42 is connected to the control unit 28 (FIG. 1) and includes two or more conductors (not shown) to pass signals relating to the flow and density of the fluid to the control unit 28 for reasons to be described. Although not shown in the drawings it is understood that an electrical signal-conducting cable also connects the output of the control unit 28 to the motor 32 to drive same as also will be described.

A disc-like valve unit 50 is disposed in the subhousing 30b immediately below, and in a coaxial relationship with, the member 40. The unit 50 has an enlarged base portion 50b which is affixed to the lower end of the housing 30 by a series of bolts 51 (two of which are shown in FIG. 2) which extend through aligned openings in the base portion 50b and the housing 30. Thus, the member 40 rotates relative to the fixed valve unit 50 with the arrangement being such that this rotation controls the flow of fluid through the assembly 22 in a manner to be described.

FIG. 3 better depicts the relationship between the member 40 and the valve unit 50. More particularly, the valve unit 50 has a series of five through ports 50c–50g which extend through the body member 50 and which serve as inlets. The inlet ports 50c–50g are angularly spaced around the body member 50a and, as shown in FIG. 1, are connected to the dispensing units 20a–20e, respectively, by five tubes 52a–52e, which, in turn, are connected to, or form a portion of, the vapor/air mixture recovery hoses (not shown) respectively associated with the above-mentioned hose and nozzle assemblies of the units 20a–20e.

Referring to FIG. 3, each inlet port 50c–50g extends from the lower surface of the body member 50a, where the port is circular in cross section, to the upper surface of the body member 50a where the port is rectangular in cross section. A through opening 50h extends through the center of the body member 50a and serves as an outlet. The outlet opening 50h is circular in cross section with its diameter being relative large at the lower surface of the body member 50a and relatively small at its upper surface, and is connected, via a tube 54 (FIG. 1), to the inlet of the vapor/air mixture pump 24. A series of pie-shaped slots 50i–50m are also formed in the upper surface of the unit 50 and are angularly spaced around the opening 50h. The slots 50i–50m function in tandem with the ports 50c–50g, respectively to allow the vapor/air mixture to flow through the member 40 as will be described.

As also shown in FIG. 3, an arcuate, inlet slot 40a is provided in the lower surface of the metering member 40 near its outer periphery and is adapted to selectively align with one of the inlet ports 50c–50g of the valve unit 50 when the units are in their assembled condition and when the assembly is operating. An extended opening is formed at one end portion of the inlet slot 40a and registers with one end of a passage 40b formed in the interior of the member 40 and extending to an extended opening formed in a pie-shaped slot 40c formed on the lower surface of the metering member 40. An elongated slot 40d is also formed on the lower surface of the metering member 40 which has one end portion slightly spaced from the slot 40c, with the remaining portion of the slot 40d extending towards the center of the member 40. The other end of the slot 40d registers with the outlet opening 50h of the valve unit 50 when the units 40 and 50 are in their assembled condition.

A series of ramps 40e are formed on the lower surface of the member 40 and extend around the slots 40a, 40c and 40d. Also, additional ramps 40e are provided which define two wedge shaped recesses 40f and 40g which extend to the respective sides of the slot 40c. Each of the recesses 40f and 40g are thus separated from the slot 40c by a ramp 40e to prevent leakage as the member 40 rotates relative to the unit 50, as will be described.

A circumferential groove 40h is formed on the outer periphery of the member 40 and receives a pin 56 extending from the upper surface of the unit 50 near the opening 50e. The groove 40h does not extend for the complete circumference of the member 40 and thus has two ends which serve as stops for the pin.

Upon actuation of one of the units 20a–20e of the dispensing station 16a, the basic valving technique made possible by the interaction of the member 40 and the unit 50 involves rotating the member 40 in response to actuation of the motor 32 until the slot 40a aligns with the inlet port 50c–50g corresponding to the selected unit 20a–20e. This allows the flow of vapor/air mixture from the selected unit 20a–20e, through a corresponding tube 52a–52d and to the corresponding inlet port 50c–50g of the unit 50. The vapor/air mixture then flows into the inlet slot 40a of the member 40, through the passage 40b and to the slot 40c. The flow is then allowed to flow over the ramp 40e extending between the slots 40c and 40d and into the latter slot due to the presence of one of the slots 50i–50m extending over the latter ramp and corresponding to the particular inlet port 50c–50g selected. From the slot 40d, the vapor/air mixture flows into and through the outlet opening 50h of the unit 50 from which it exits the meter/valve assembly 22 and passes, via the tube 54, to the vapor/air mixture pump 24 and back to the underground tank 10.

Figure 4:
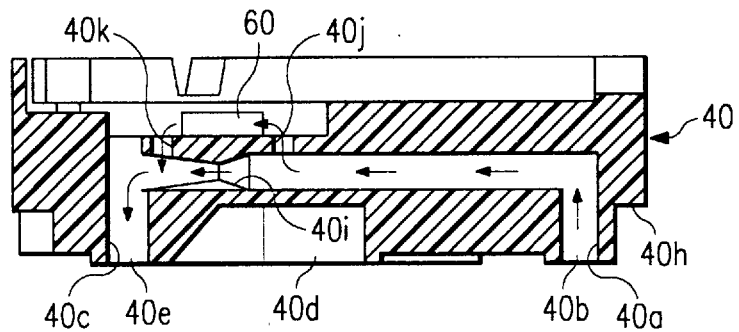
FIG. 4 is a sectional view taken along the line 4—4 of FIG. 3.

The particular structure of the member 40 that forms the above-mentioned passages and slots is better shown in FIG. 4. More particularly, as described above, the vapor/air mixture flows from the vertical extended opening at the end of the slot 40a, through the horizontal passage 40b, and then downwardly through the vertical extended opening of the slot 40c. As shown, the ramp 40e forms a barrier to the flow of vapor/air mixture from the slot 40c to the slot 40d unless one of the slots 50i–50m of the unit 50 (not shown in FIG. 4) extends over the ramp, as will be described.

A fluidic flow metering unit 60, in the form of a negative fluidic feedback oscillator, is disposed in a section of the member 40 extending above the passage 40b, as viewed in FIG. 4, so that the vapor/air mixture flow is metered as it passes through the member. To this end, the downstream portion of the passage 40a is reduced in cross section to form a venturi 40i, and two spaced, through openings 40j and 40k are formed through a common wall of the member 40 extending between the passage 40b and the flow metering unit 60. The openings 40j and 40k extend to either side of the venturi 40i so that a portion of the vapor/air mixture flowing through the passage 40b is diverted into the opening 40j upstream of the venturi 40i and passes through the flow metering unit 60 before returning, through the opening 40k, to the passage 40b at a location downstream of the venturi.

The flow metering unit 60 is a conventional, oscillating-jet flowmeter which produces an output signal having a frequency proportional to the volumetric flow of the vapor/air mixture, and an amplitude proportional to the pressure drop over the flow metering unit 60 and the venturi 40i and its essential components are disclosed in U.S. Pat. No. 4,949,755 and No. 5,127,173, the disclosures of which are hereby incorporated by reference. The mass flow of the mixture can then be determined utilizing Bernoulli's equation as will be described and as disclosed in U.S. Pat. No. 4,508,127 the disclosure of which is also hereby incorporated by reference. Since the flow metering unit 60 is conventional its specific components are not shown in the drawings but will be described briefly as follows. The unit 60 consists of a jet oscillator and a piezo-ceramic transducer. The jet oscillator is in parallel with the nozzle section of the venturi 40*i* and ejector ports are located at the throat of the venturi where the flow from the oscillator rejoins the venturi flow.

A portion of the vapor/air mixture from the passage 40*b* passes through the opening 40*j* and enters the flow metering unit 60 and a portion flows through the fluid oscillator, with the percentage of total flow which flows to the oscillator being determined by the ratio of oscillator nozzle throat area to the throat area of the venturi 40*i* in the passage 40*b*. Since this percentage is constant over the operating range of the flow metering unit 60, the oscillator flow rate is an accurate indication of total flow.

The nozzle of the fluid oscillator forms a jet of the vapor/air mixture which is directed across an open area toward the adjacent entrances of two feedback channels. Each feedback channel is connected to side ports which are directly opposed and located immediately downstream of the nozzle exit. Jet velocity is converted to static pressure at the entrance to the feedback channels and the latter are also connected to either side of a piezoceramic transducer that converts differential pressure fluctuations to an alternating voltage signal. As pressure rises in one feedback channel, increasing pressure at the corresponding side port deflects the jet away from the centerline. Pressure then begins to increase in the other feedback channel and the process repeats itself. The jet oscillates between the two feedback channels at a frequency determined by jet velocity and the piezoceramic transducer senses the frequency of the differential pressure fluctuations in the feedback channels and converts them to an electrical output signal. The vapor/air mixture flowing through the oscillator is collected in the open area between the nozzle exit and the feedback channel entrances and is ported back, via the opening 40*k* to the venturi 40*i* where it rejoins the main flow in the passage 40*b*. A large percentage of the pressure drop from the flowmeter inlet to the venturi throat is recovered by the diffuser section of the venturi which minimizes the overall pressure drop of the flowmeter. Thus, the continuous, self-induced oscillation is at a frequency that is proportional to the volumetric flow rate of the vapor/air mixture and at an amplitude that is proportional to the pressure drop over the flow metering unit 60 and the venturi 40*i*.

It is understood that the member 40 is provided with proper electronics to condition the output signal from the transducer sensor of the jet oscillator described above into two independent scaled pulsed output signals which are transmitted, via the cable 42, to the control unit 28. These output signals correspond to the volumetric flow of the mixture and the pressure drop over the flow metering unit 60 and the venturi 40*i*, and the control unit 28 measures and calculates the density of the gasoline vapor and the density of the air in the vapor/air mixture, and produces additional corresponding output signals, as will be described.

The operation of the meter/valve assembly 22 will be described with reference to FIGS. 5–8 of the drawings. (Since FIGS. 5–8 are bottom plan views, the various slots and ramps of the member 40 are shown in dashed lines). The assembly 22 is shown in its rest position in FIG. 5 with the pin 56 located at the end of the slot 40*h*. In this position, although the inlet port 50*c* of the unit 50 overlaps an end portion of the slot 40*a* of the member 40, there is no flow since the slot 50*i*, corresponding to the port 50*c*, is out of alignment with the slots 40*c* and 40*d*.

Figure 5:
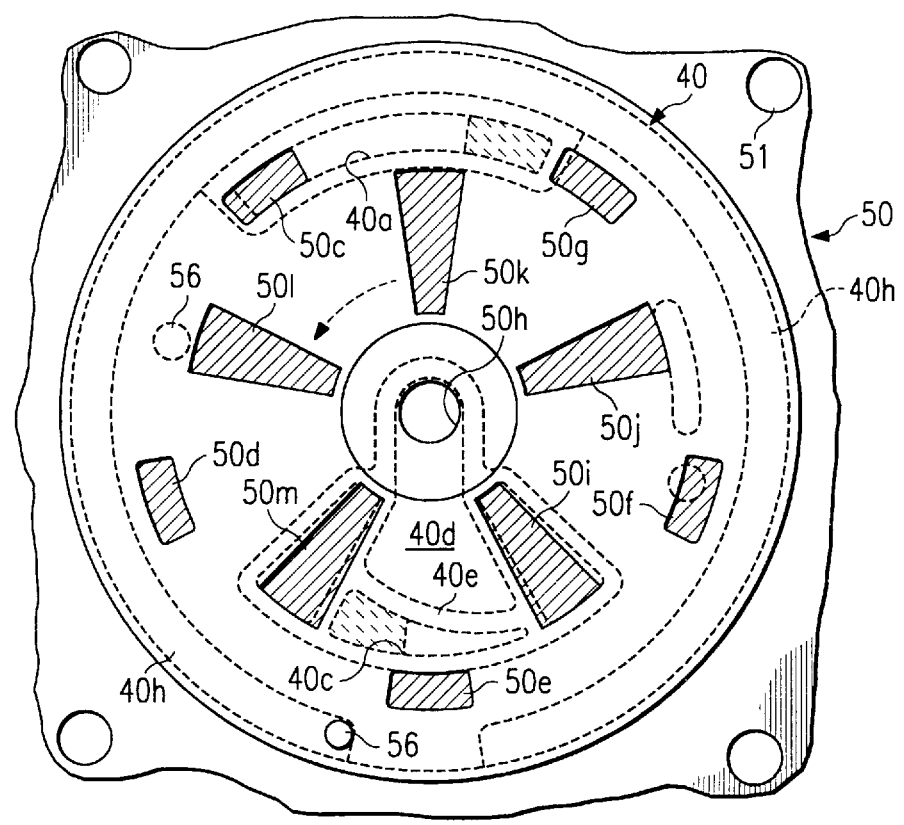
FIGS. 5–8 are bottom plan views depicting different operational modes of the meter/valve assembly of FIG. 2.
Figure 6:
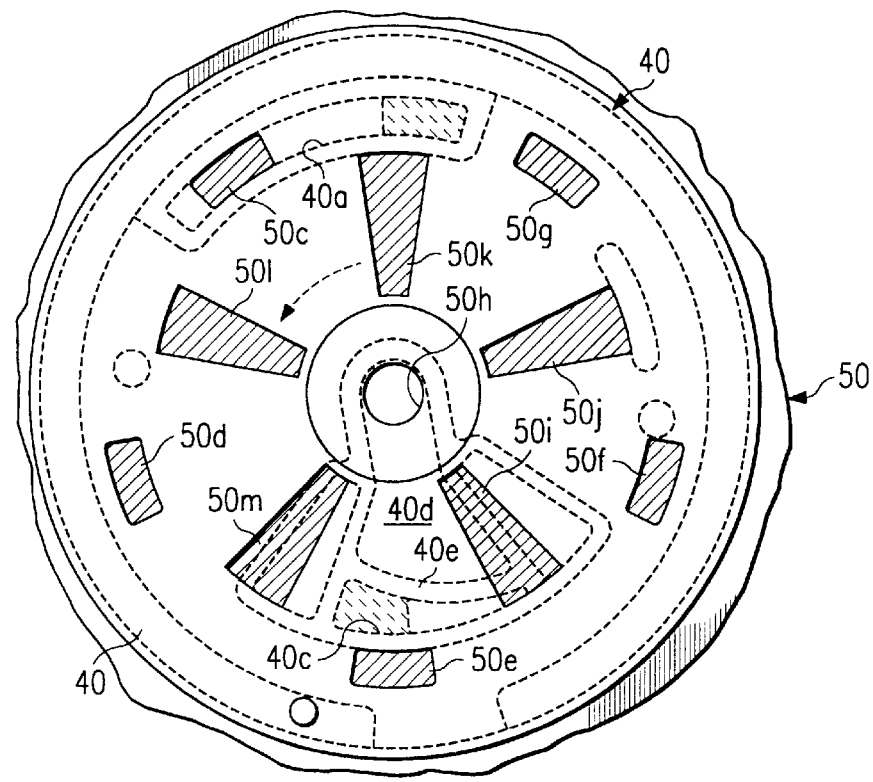

Assuming the dispensing nozzle associated with the unit 20*a* is lifted off of the dispenser by an operator but before it is actuated by the operator, the control unit 28 actuates the motor 32 to move the member 40 in a counter-clockwise relation relative to the unit 50 until the member 40 reaches a position between the positions shown in FIGS. 5 and 6, which is a standby mode. In this position, the slot 50*i* is out of alignment with the slots 40*c* and 40*d*, as well as the ramp 40*e*, so that the latter ramp thus blocks the flow of any vapor/air mixture remaining in the assembly 22 from the slot 40*c* to the slot 40*d*. Upon actuation of the unit 20*a* (FIG. 1) by the operator, the motor 14 is actuated and the pump 12 pumps gasoline from the tank 10, through the gasoline flow meter 18 and through the dispensing nozzle associated with the unit 20*a* and into the vehicle tank. The gasoline flow is sensed by the flow meter 18 and a corresponding signal is sent to the control unit 28. A corresponding signal from the control unit 28 is sent to the motor 32 which is actuated to rotate the member 40 in a counterclockwise direction relative to the unit 50, as viewed in FIG. 5, until the member 40 reaches the position relative to the unit 50 as shown in FIG. 6. In this position, the port 50*c* is fully aligned with the slot 40*a* and the slot 50*i* slightly overlaps the slots 40*c* and 40*d* and, more particularly, a portion of that portion of the ramp 40*e* extending between the slots 40*c* and 40*d*.

In the meantime, and assuming the vehicle to which the gasoline is being dispensed is not equipped with a onboard refueling vapor recovery system, the gasoline entering the vehicle tank displaces a volume of gasoline vapor/air mixture from the tank which rises to the filler neck of the tank. The motor 26 is actuated to drive the vapor/air mixture pump 24 which assists in drawing the vapor/air mixture from the vehicle tank, and passing it through the vapor/air mixture recovery hose associated with the unit 20*a*, the tube 52*a* and to the inlet port 50*c* of the unit 50. The vapor/air mixture then flows from the port 50*c*, through the slot 40*a*, the passage 40*b* and to the slot 40*c*. Limited vapor/air mixture flow thus occurs from the slot 40*c*, across the relatively narrow passage provided by the slot 50*i* extending over the corresponding portion of the ramp 40*e*, and to the slot 40*d*. From the slot 40*d*, the vapor/air mixture flows through the opening 50*h* of the unit 50 which registers with the slot 40*d* and therefore exits the assembly 22 and passes to the pump 24, via the tube 54. During this mode, a portion of the mixture in the passage 40*b* is diverted through the opening 40*j* and passes through the flow metering unit 60 before returning to the passage 40*b*.

The flow metering unit 60 produces an output signal having a frequency proportional to the volumetric flow $(dv/dt)$ of the vapor/air mixture in the vehicle tank, and an amplitude proportional to the pressure drop $(dp)$ over the flow metering unit 60 and the venturi unit 40*i*, as discussed above. The density of the vapor/air mixture can then be calculated utilizing these signals and applying Bernoulli's equation as follows:

$$dp = \text{density} \times (dv/dt)^2 \div 2.$$

Moreover, samples of ambient air in the vicinity of the unit can easily be captured when the slot 40*a* passes over a port 50*c*–50*f* not in use during rotation of the member 40 as described above and the density of the air sample can easily be calculated as a result of it passing across the unit 60 in the manner discussed above. (In this context, it is noted that this sampling of air is possible only when units 20*b*–20*e* are actuated and not when unit 20*a* is actuated. In the latter case, the air density may be set at a predetermined value without severely compromising the accuracy of the signals.) Therefore, the density of the gasoline vapor in the vapor/air mixture passing from the vehicle tank can be determined by subtracting the air density from the density of the mixture.

It is understood that the unit 28 has a microprocessor, or the like, to process these input signals and produce an output signal in accordance with the gasoline flow, the vapor flow and the vapor density as well as possible other preselected parameters discussed above, which output signal is sent to the motor 32 to rotate the member 40, and thus control the vapor/air mixture flow, accordingly.

Figure 7:
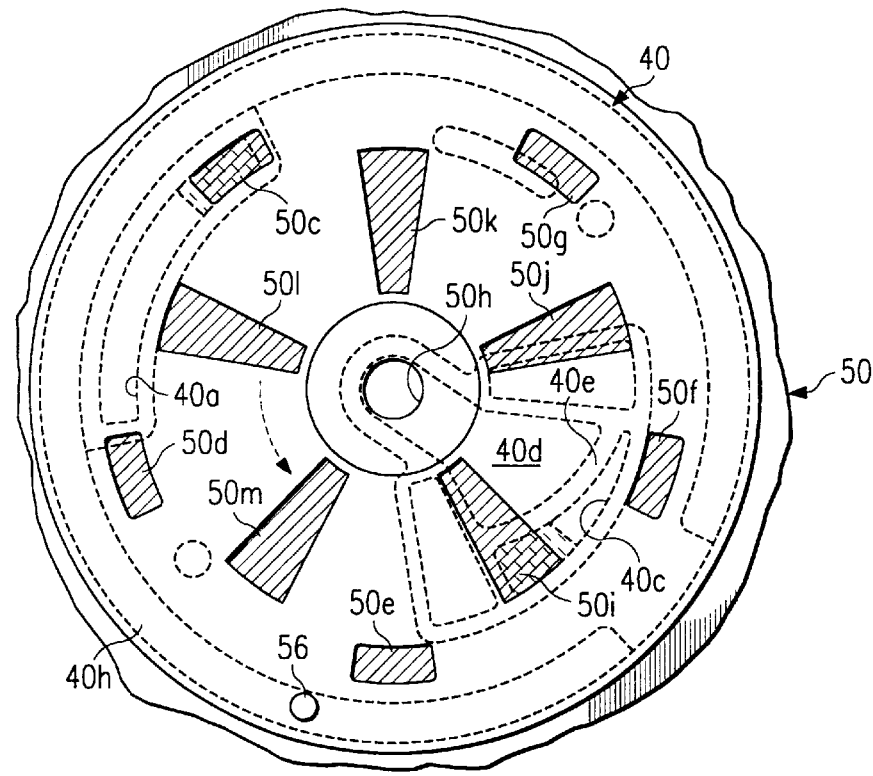

Assuming more vapor/air mixture flow is needed, as determined by the control unit 28 in the above manner, further rotation of the member 40 in a counter-clockwise direction relative to the unit 50 continues until the member 40 reaches the position shown in FIG. 7. In this position maximum vapor/air mixture flow is achieved since the port 50*c* is still fully aligned with the slot 40*a* and since the slot 50*i* completely bypasses that portion of the ramp 40*e* extending between the slots 40*c* and 40*d*. Thus, the vapor/air mixture flows in the same manner as described in connection with the mode of FIG. 6, but at a higher rate. It is noted that the member 40 can rotate in both a clockwise direction relative to the unit 50 to decrease vapor/air mixture flow and, of course, in a counter-clockwise direction to increase flow as determined by the control unit in the above manner.

Once the dispensing nozzle associated with the unit 20*a* is shut off by the operator, or automatically in response to the filling of the vehicle tank, but before the nozzle is returned to the dispenser housing associated with the unit 20*a*, the control unit 28 actuates the motor 32 to move the member 40 in a clockwise relation relative to the unit 50 until it returns to the standby mode between the positions of FIGS. 5 and 6. As discussed above, in this position the slot 50*i* is out of alignment with the slots 40*c* and 40*d*, as well as the ramp 40*e*, so that the latter ramp thus blocks the flow of any vapor/air mixture remaining in the assembly 22 from the slot 40*c* to the slot 40*d*. When the nozzle is then returned to the dispenser housing, an appropriate signal is then sent to the motor 32 from the control unit 28 which causes the motor to rotate the member 40 back to the starting position of FIG. 5 where it rests until another unit is actuated and the operation described above is repeated in connection with the particular unit 20*a*–20*e* that is actuated.

Of course, when another unit 20*a*–20*e* of the station 16*a* is later actuated, the member 40 is rotated to the position corresponding to the unit actuated. For example, if the nozzle associated with the unit 20*b* is removed from the dispenser housing, the member 40 would rotate to the position of FIG. 8, which is the standby position for unit 20*b*. In this position, the port 50*d*, corresponding to the unit 20*b*, is located in alignment with the slot 40*a*; and the slot 50*j*, which also corresponds to the unit 20*b*, is located immediately adjacent the slots 40*c* and 40*d* and the ramp 40*e* extending between the latter slots. Upon actuation of the dispensing nozzle associated with the unit 20*b*, the operation of the assembly 22 then continues as described above in connection with the unit 20*a*.

Figure 8:
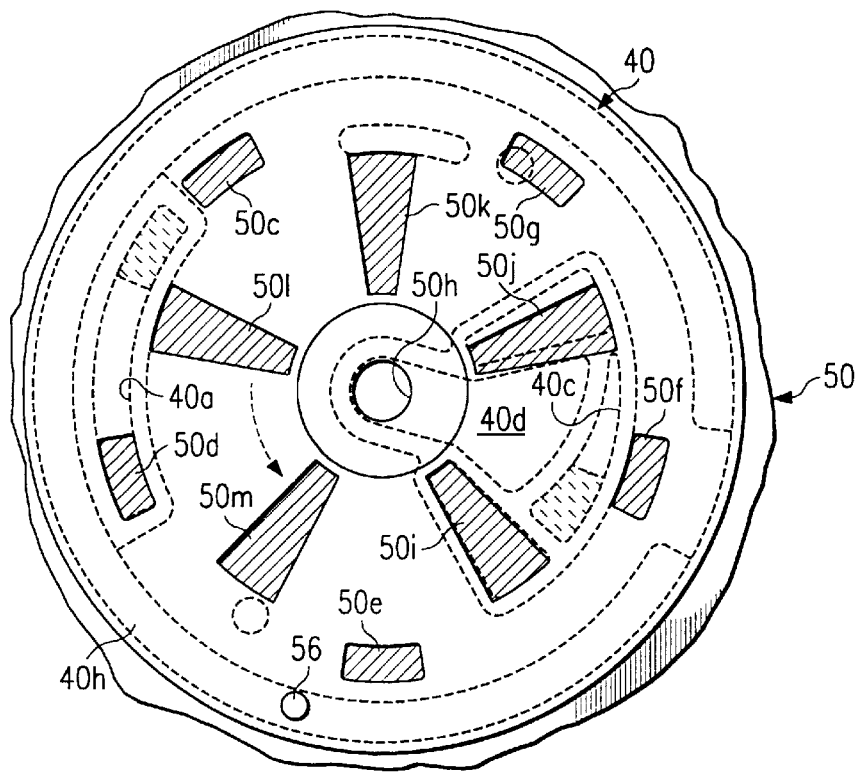

Once the dispensing nozzle associated with the unit 20*b* is shut off by the operator, or automatically in response to the filling of the vehicle tank, but before the nozzle is returned to the dispenser housing associated with the unit 20*b*, the control unit 28 actuates the motor 32 to move the member 40 in a clockwise relation relative to the unit 50 until the member 40 reaches the standby position shown in FIG. 8. In this position, the ramp 40*e* blocks the flow of any vapor/air mixture remaining in the assembly 22 as described above. When the nozzle is then returned to the dispenser housing, an appropriate signal is then sent to the motor 32 from the control unit 28 which causes the motor to rotate the member 40 back to the position of FIG. 5, which is the starting position for all of the units 20*a*–20*e*. The member 40 then rests in the position of FIG. 5 until another unit 20*a*–20*e* is actuated.

It is noted that when the member 40 is in the standby position of FIG. 8 after the dispensing unit associated with the unit 20*b* has been shut off as discussed above, if a dispensing unit associated with the station 16*b* is in use, the control unit 28 will not actuate the motor 32 to return the member 40 to the starting position of FIG. 5. Rather, the member 40 will remain in the standby position of FIG. 8 until the dispensing unit of the station 16*b* is put out of service or until another unit of the station 16*a* is actuated. This prevents the member 40 of the station 16*a*, during its return to the position of FIG. 5, from exposing the inlet port 50*c* to atmospheric air (through the various passages and slots in the members 40 and 50 discussed above) which air would be drawn into the apparatus by the pump 24, since the latter is actuated during the operation of a dispensing unit of the station 16*b*. This is also true with respect to the standby positions corresponding to the units 20*c*–20*e*.

During all of the above-described rotation of the member 40 relative to the unit 50, the pin 56 rides in the slot 40*h* with the ends of the latter slot serving as mechanical stops to establish limits for the rotation of the member 40, and, in addition, establishes the initial position of the member 40 relative to the unit 50 in the event of a power failure, an error signal, or the like.

Figure 9:
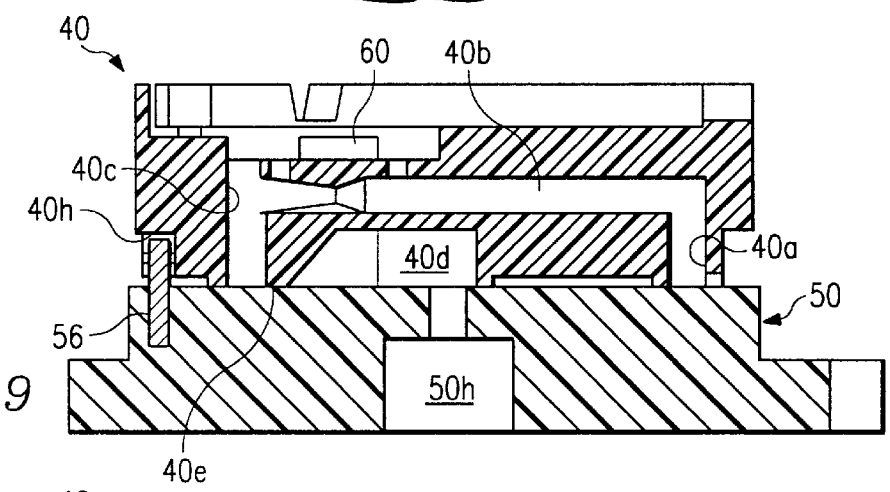
FIGS. 9 and 10 are sectional views of the meter valve assembly of FIG. 2.
Figure 10:
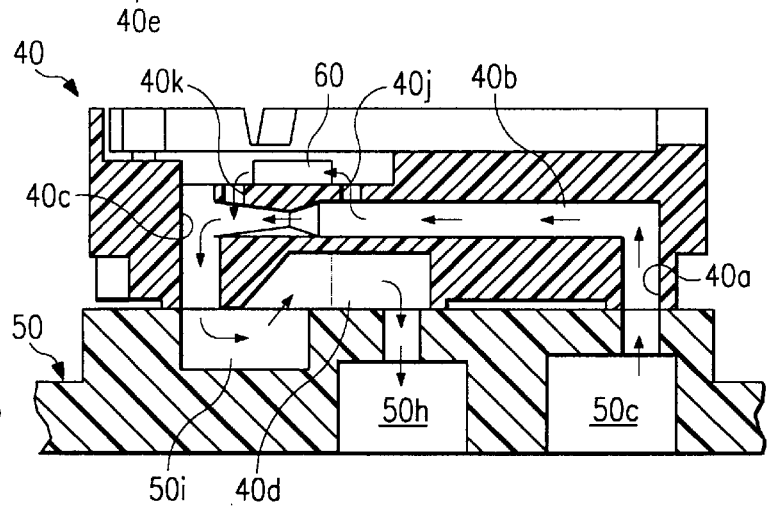

FIGS. 9 and 10 depict the structural relationship between the member 40 and the unit 50 in the fully closed position of FIG. 5 and the fully open position of FIG. 7, respectively, and more particularly the relationship between the various slots and openings in the units 40 and 50. In the fully blocked view of FIG. 9, the non-slotted surface of the unit 50 extends over the ramp 40*e* which thus prevents vapor/air mixture flow from the slot 40*c* to the slot 40*d*. Upon rotation of the member 40 to the fully open position of FIG. 10, the slot 50*i* connects the slots 40*c* and 40*d* and thus enables vapor/air mixture to flow over the ramp 40*e*, into and through the slot 40*d* and then exit the assembly 22, via the opening 50*h*.

In this manner, the return of vapor/air mixture from the vehicle tank can be precisely controlled in response to the flow of gasoline to the tank. For example, the control unit 28 can operate to control the vapor/air mixture flow in the above manner so that it is proportional to the gasoline flow. Alternately, the vapor/air mixture flow can be controlled taking into account one or more external factors, such as nozzle design, vehicle fill pipe design, weather conditions, wind, vehicle fuel tank temperature, fuel temperature, atmospheric pressure, etc.

Under certain conditions, such as when the vehicle being refueled is equipped with an onboard refueling vapor recovery system as discussed above, the vapor/air mixture recovered from the vehicle tank may be pure air, or substantially pure air. If this occurs and if the pure air, or substantially pure air is withdrawn from the vehicle tank and passed to the gasoline underground storage tank, excessive pressurization of the tank and fugitive emissions will occur, which lowers the efficiency of the system and could create a hazardous condition. In these situations, the system of the present invention would operate as discussed above, i.e. the control unit 28 would receive signals from the flow metering unit 60 which, when processed, indicates a pure air, or substantially pure air condition. The unit would 28 would then generate an output signal to the unit 22 to reduce or terminate all vapor/air mixture recovery from the vehicle tank accordingly.

Several other advantages result from the foregoing. For example, a single vapor/air mixture pump 24 and a single meter/valve assembly 22 serve a plurality of dispensing units. Also, the vapor/air mixture flow metering through the member 40 takes place upstream of the valve unit 50 so that the measurements of the former are not affected by any expansion of the vapor/air mixture when it leaves the valve unit. Further, the provision of the ramps 40e on the surface of the member 40 results in a relatively low surface contact with the corresponding surface of the unit 50, thus reducing friction during the above-described rotation of the member 40.

It is understood that variations may be made in the foregoing without departing from the scope of the invention. For example, instead of one hose and nozzle assembly being associated with each dispensing unit 20a–20d as described above, a single hose and nozzle assembly can be provided with each dispensing station 16a and 16b along with valving to blend the gasoline from multiple storage tanks (if provided) and selectively direct the particular gasoline formulation to the single hose and nozzle dispenser. In this arrangement, the above-mentioned microprocessor would operate the assembly 22 in a manner so that only one of the inlet ports 50c–50g would be functional.

Also, rather than use the above-described jet oscillator in the unit 60, a separate differential pressure transducer may be located in parallel with the flow metering unit 60 that produces a signal proportional to the pressure drop over the flow metering unit 60 and the venturi unit 40i. The advantage of this is the pressure drop external to the oscillator is static and therefore, more accurate than the oscillating pressure drop sensed by the flow meter itself, as described above.

Also, rather than capture samples of ambient air in the vicinity of the unit when the slot 40a passes over a port 50c–50f not in use during rotation of the member 40 and then calculate the density of the air sample, as described above, the air density can also be set at a predetermined value.

Further, rather than designing the control unit 28 so that it performs the above-mentioned measurements and calculations and produces an additional output signal corresponding to the density, or amount, of gasoline vapor in the vapor/air mixture, the electronics in the member 40 can be adapted to do so. In this case, the output signal would be sent, via the cable 42, to the control unit 28 along with the signal corresponding to the volumetric flow of the mixture as described above. The control unit 28 would receive these signals from the assembly 22 as well as a signal from the gasoline flow meter 18, which is proportional to the gasoline flow through the actuated unit.

Further, the present invention is not limited to use with vapor recovery, but is equally applicable to other applications requiring the control of fluid from multiple locations. For example, it could be used in connection with the control of the flow of gasoline, or other fluids, from multiple sources, such as at a service station of the type described above. Also, the present invention is not limited to the particular flow meter discussed above, but can also utilize other flow meters, such as, for example, a unit manufactured and distributed by the Moore Products Co., of Springhouse, Pa.

Further modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A system for recovering a mixture of gasoline vapor and air flowing from a vehicle tank during dispensing of gasoline into the tank, the system comprising a flow metering unit adapted to be connected to the tank for receiving the mixture as it flows from the tank and for producing an output signal proportional to the volumetric flow of the mixture and the pressure drop over the flow metering unit, a flow varying unit for varying the flow of the mixture from the tank, and a control unit connected to the flow metering unit and to the flow varying unit for receiving the output signal, determining the density of the gasoline vapor in the mixture based on the output signal, and controlling the operation of the flow varying unit, and therefore the flow of the mixture from the tank, in response to the density of the gasoline vapor in the mixture.

2. The system of claim 1 wherein the flow varying unit is a valve and wherein the position of the valve controls the flow of mixture from the tank.

3. The system of claim 1 further comprising a unit operatively connected to the control unit for measuring the flow of the gasoline into the tank, the control unit also controlling the operation of the flow varying unit in response to the flow of gasoline into the tank.

4. The system of claim 1 wherein the control unit responds to a reduction in the density of the gasoline vapor in the mixture and controls the flow varying unit to reduce the flow of the mixture from the tank accordingly.

5. The system of claim 1 wherein a gas dispensing nozzle is provided for dispensing the gasoline into the tank and further comprising a conduit extending from the nozzle to the flow metering unit for passing the mixture to the flow metering unit.

6. The system of claim 1 wherein there are a plurality of sources of the gasoline and a plurality of the nozzles and conduits, and wherein the flow varying unit comprises means for selectively passing the mixture from the nozzles and conduits to the flow metering unit.

7. The system of claim 2 wherein the valve comprises a first unit having a number of inlets respectively connected to the conduits and at least one opening, a second unit having an inlet and an outlet which are normally out of communication to prevent flow therethrough, and a drive member for moving one of the units relative to the other unit so that one of the inlets of the first unit registers with the inlet of the second unit and so that the opening of the first unit communicates the inlet of the second unit with the outlet of the second unit to permit flow of the mixture from the inlet of the first unit, through the inlet of the second unit, and to the outlet of the second unit for discharge therefrom.

8. The system of claim 1 wherein the control unit including means for calculating the density of the mixture based on the output signal and for determining the density of the gasoline vapor in the mixture based on the density of the mixture.

9. A method for recovering a mixture of air and gasoline vapor flowing from a vehicle tank during dispensing of gasoline into the tank, the method comprising the steps of measuring the flow of the mixture from the tank to produce an output signal having a frequency proportional to the volumetric flow of the mixture and an amplitude proportional to the pressure drop of the mixture, calculating the density of the mixture based on the volumetric flow and pressure drop, determining the density of the vapor in the mixture based on the density of the mixture, and varying the flow of the mixture from the tank in response to the amount of gasoline vapor in the mixture.

10. The method of claim 9 further comprising the step of measuring the flow of said gasoline into said tank, and wherein said step of varying also varies the flow of said mixture from said tank in response to said flow of gasoline into said tank.

11. The method of claim 9 wherein, upon the amount of gasoline vapor in said mixture falling below a predetermined value, said step of varying terminates said flow of said mixture from said tank.

12. The method of claim 9 wherein said step of determining comprises the steps of measuring the flow of said mixture from said tank and determining the amount of gasoline vapor in said mixture based on the flow conditions of said mixture.

13. The method of claim 9 wherein said latter step of determining comprises the steps of determining the density of said air and subtracting the air density from the density of said mixture.

14. The method of claim 9 further comprising the step of establishing a vacuum at said vehicle tank to promote said flow of said mixture from said tank.

15. A system for recovering a mixture of air and gasoline vapor flowing from a vehicle tank during dispensing of gasoline into the tank, the system comprising a flow metering unit for selectively receiving samples of the mixture and samples of air and for determining flow conditions of the mixture and the air and producing an output signal proportional to the volumetric flow of the mixture and the air and the pressure drop of the mixture and the air over the flow metering unit, a flow varying unit for varying the flow of the mixture from the tank, and a control unit connected to the flow metering unit and to the flow varying unit for calculating the density of the mixture and the air based on their respective volumetric flows, determining the density of the gasoline vapor in the mixture based on the density of the mixture and the density of the air, and adjusting the position of the flow varying unit, and therefore the flow of the mixture from the tank, accordingly.

16. The system of claim 15 further comprising a flow meter operatively connected to said control unit for measuring the flow of said gasoline into said tank, said control unit also adjusting the position of said second means in response to said flow of gasoline into said tank.

17. The system of claim 15 wherein said control unit responds to a reduction in the density of said gasoline vapor in said mixture and adjusts said flow varying unit to reduce said flow of said mixture from said tank accordingly.

18. A system for dispensing gasoline from a plurality of storage tanks into an vehicle tank and recovering a mixture of air and gasoline vapor from the vehicle tank, the system comprising a plurality of gas dispensing nozzles for respectively dispensing the gasoline from one of the storage tanks into the vehicle tank, a flow metering device, a plurality of conduits respectively extending from the nozzles to the flow metering device for passing the mixture to the flow metering device, the flow metering device determining flow conditions of the mixture as it flows from the vehicle tank and for generating an output signal corresponding to the flow conditions, a flow varying unit for selectively passing the gasoline vapor from the nozzles and conduits to the flow metering device and for varying the flow of the mixture from the tank, and a control unit connected to the flow metering device and to the flow varying unit for adjusting the position of the flow varying unit, and therefore the flow of the mixture from the vehicle tank, in response to the density of the gasoline vapor; wherein the flow varying unit comprises a first unit having a number of inlets respectively connected to the sources and at least one opening, a second unit having an inlet and an outlet which are normally out of communication to prevent flow therethrough, and drive means for moving one of the first or second units relative to the other unit so that one of the inlets of the first unit registers with the inlet of the second unit and so that the opening of the first unit communicates with the inlet of the second unit and with the outlet of the second unit to permit the flow of the mixture from the one inlet of the first unit, through the inlet of the second unit, and to the outlet of the second unit for discharge therefrom.

19. The system of claim 18 herein said drive means is adapted to move said one unit relative to said other unit to another position in which said opening of said first unit does not communicate said inlet and outlet of said second unit to prevent said flow of said mixture.

20. The system of claim 19 wherein said first unit has an outlet that communicates with said outlet of said second unit for receiving said discharged mixture therefrom.

21. The system of claim 20 wherein said outlet of said first unit is adapted to be connected to a vacuum pump for promoting said flow of said mixture.

22. A system for recovering a mixture of gasoline vapor and air flowing from a vehicle tank during dispensing of gasoline into the tank, the system comprising a flow metering unit connected to the tank for receiving the mixture as it flows from the tank and for generating a first output signal corresponding to the flow conditions of the mixture, the flow metering unit also selectively receiving ambient air and generating a second output signal corresponding to the flow conditions of the air, a flow varying unit for varying the flow of the mixture from the tank, and a control unit connected to the flow varying unit and to the flow metering unit for processing the first and second output signals, determining the density of the gasoline vapor in the mixture based on the output signals, and adjusting the position of the flow varying unit, and therefore the flow of the mixture from the tank, in response to the density of the gasoline vapor.

23. The system of claim 22 further comprising a measuring unit operatively connected to the control unit for measuring the flow of the gasoline into the tank, the control unit also adjusting the position of the flow varying unit in response to the flow of gasoline into the tank.

24. The system of claim 22 wherein the control unit responds to a reduction in the density of the gasoline vapor in the mixture and adjusts the flow varying unit accordingly to reduce the flow of the mixture from the tank accordingly.

25. The system of claim 22 wherein the first output signal is proportional to the volumetric flow of the mixture and the pressure drop of the mixture over the flow metering unit; wherein the control unit includes means for calculating the density of the mixture based on the first output signal; wherein the second first output signal is proportional to the volumetric flow of the air and the pressure drop of the air over the flow metering unit; and wherein the control unit includes means for calculating the density of the air based on the second output signal, and determining the density of the gasoline vapor in the mixture based on the density of the mixture and the density of the air.

26. The system of claim 22 wherein a gas dispensing nozzle is provided for dispensing the gasoline into the tank and further comprising a conduit extending from the nozzle to the flow metering unit for passing the mixture to the flow metering unit.

27. The system of claim 26 herein there are a plurality of sources of the gasoline and a plurality of the nozzles and conduits, and wherein the flow varying unit further comprising means for selectively passing the gasoline vapor from the nozzles and conduits to the flow metering unit.

28. The system of claim 27 wherein the flow varying unit comprises a first unit having a number of inlets respectively connected to the conduits and at least one opening, a second unit having an inlet and an outlet which are normally out of communication to prevent flow therethrough, and a drive member for moving one of the units relative to the other unit so that one of the inlets of the first unit registers with the inlet of the second unit and so that the opening of the first unit communicates the inlet of the second unit with the outlet of the second unit to permit flow of the mixture from the inlet of the first unit, through the inlet of the second unit, and to the outlet of the second unit for discharge therefrom.

29. The system of claim 28 wherein the drive member is adapted to move the first unit relative to the other unit to another position in which the opening of the first unit does not communicate with the inlet and outlet of the second unit to prevent the flow.

30. The system of claim 29 wherein the first unit has an outlet that communicates with the outlet of the second unit for receiving the discharged mixture therefrom.

31. The system of claim 30 wherein the outlet of the first unit is adapted to be connected to a vacuum pump for promoting the flow of the mixture.

32. A system for recovering a mixture of gasoline vapor and air flowing from a vehicle tank during dispensing of gasoline from a plurality of sources through one of a plurality of nozzles into the tank, the system comprising a flow metering unit, a plurality of conduits respectively extending from the nozzles, a valve for selectively passing the mixture from the conduits to the flow metering unit and for varying the flow of the mixture from the tank to the flow metering unit, the flow metering unit generating an output signal proportional to the volumetric flow of the mixture and the pressure drop over the flow metering unit, and a control unit connected to the valve and to the flow metering unit for receiving the output signal, the control unit including means for calculating the density of the mixture based on the output signal, for determining the density of the gasoline vapor in the mixture based on the density of the mixture, and for adjusting the position of the valve, and therefore the flow of the mixture from the tank, in response to the density of the gasoline vapor in the mixture, the valve comprising a first unit having a number of inlets respectively connected to the conduits and at least one opening, a second unit having an inlet and an outlet which are normally out of communication to prevent flow therethrough, and a drive member for moving one of the units relative to the other unit so that one of the inlets of the first unit registers with the inlet of the second unit and so that the opening of the first unit communicates the inlet of the second unit with the outlet of the second unit to permit flow of the mixture from the inlet of the first unit, through the inlet of the second unit, and to the outlet of the second unit for discharge therefrom.

33. The system of claim 32 further comprising a unit operatively connected to the control unit for measuring the flow of the gasoline into the tank, the control unit also adjusting the position of the valve in response to the flow of gasoline into the tank.

34. The system of claim 32 wherein the control unit responds to a reduction in the density of the gasoline vapor in the mixture and adjusts the valve to reduce the flow of the mixture from the tank accordingly.

35. The system of claim 32 wherein the flow metering unit produces an output signal proportional to the volumetric flow of the mixture and the pressure drop over the flow metering unit, and wherein the control unit includes means for calculating the density of the mixture based on the output signal and for determining the density of the gasoline vapor in the mixture based on the density of the mixture.

36. The system of claim 35 further comprising means for selectively introducing a sample of air into the flow metering unit, the flow metering unit generating an output signal corresponding to the flow conditions of the air, the means being adapted to determine the density of the air and the density of the gasoline vapor in the mixture based on the density of the mixture and the density of the air.

37. The system of claim 32 wherein a gas dispensing nozzle is provided for dispensing the gasoline into the tank and further comprising a conduit extending from the nozzle to the flow metering unit for passing the mixture to the flow metering unit.

38. The system of claim 37 wherein there are a plurality of sources of the gasoline and a plurality of the nozzles and conduits, and wherein the valve further comprising means for selectively passing the mixture from the nozzles and conduits to the flow metering unit.

39. The system of claim 38 wherein the valve comprises a first unit having a number of inlets respectively connected to the conduits and at least one opening, a second unit having an inlet and an outlet which are normally out of communication to prevent flow therethrough, and a drive member for moving one of the units relative to the other unit so that one of the inlets of the first unit registers with the inlet of the second unit and so that the opening of the first unit communicates the inlet of the second unit with the outlet of the second unit to permit flow of the mixture form the inlet of the first unit, through the inlet of the second unit, and to the outlet of the second unit for discharge therefrom.

40. The system of claim 39 wherein the drive member is adapted to move the first unit relative to the other unit to another position in which the opening of the first unit does not communicate the inlet and outlet of the second unit to prevent the flow.

41. The system of claim 40 wherein the first unit has an outlet that communicates with the outlet of the second unit for receiving the discharged mixture therefrom.

42. The system of claim 41 wherein the outlet of the first unit is adapted to be connected to a vacuum pump for promoting the flow of the mixture.

43. A method for recovering a mixture of air and gasoline vapor from a vehicle tank during dispensing of gasoline into the tank, the method comprising the steps of measuring the flow of the mixture from the tank to produce output signals having frequencies proportional to the volumetric flows of the mixture, and amplitudes proportional to the pressure drops of the mixture; determining the density of the mixture based on the volumetric flows and pressure drops; measuring the flow of air; determining the density of the air based on the flow of the air; determining the density of the gasoline vapor based on the densities of the mixture and the air by subtracting the density of the air from the density of the mixture; and varying the flow of the mixture from the tank in response to variations in the density of the gasoline vapor in the mixture.

44. The method of claim 43 further comprising the step of measuring the flow of said gasoline into said tank, and wherein said step of varying also varies the flow of said mixture from said tank in response to said flow of gasoline into said tank.

45. The method of claim 43 wherein, upon a reduction of the amount of gasoline vapor in said mixture, said step of varying reduces said flow of said mixture from said tank accordingly.

46. The method of claim 43 further comprising the step of establishing a vacuum at said vehicle tank to promote said flow of said mixture from said tank.

47. The method of claim 43 wherein said air is ambient air.

48. A method for recovering a mixture of gasoline vapor and air flowing from a vehicle tank during dispensing of gasoline into the tank, the method comprising the steps of receiving the mixture as it flows from the tank, generating a first output signal corresponding to the flow conditions of the mixture, selectively receiving ambient air, generating a second output signal corresponding to the flow conditions of the air, receiving the first and second output signals and determining the density of the gasoline vapor in the mixture based on the output signals, and adjusting the flow of the mixture from the tank, in response to the density of the gasoline vapor.

49. The method of claim 48 further comprising the step of measuring the flow of the gasoline into the tank, and adjusting the flow of mixture from the tank in response to the flow of gasoline into the tank.

50. The method of claim 48 further comprising the steps of responding to a reduction in the density of the gasoline vapor in the mixture and reducing the flow of the mixture from the tank accordingly.

51. The method of claim 48 wherein the first output signal is proportional to the volumetric flow of the mixture and the pressure drop of the mixture over the flow metering unit, and further comprising the step of calculating the density of the mixture based on the first output signal; wherein the second first output signal is proportional to the volumetric flow of the air and the pressure drop of the air over the flow metering unit; and further comprising the steps of calculating the density of the air based on the second output signal, and determining the density of the gasoline vapor in the mixture based on the density of the mixture and the density of the air.

52. The method of claim 48 wherein there are a plurality of sources of the gasoline and a plurality of the nozzles for dispensing the gasoline in the tank, and further comprising the step of selectively passing the mixture from the nozzles in response to the dispensing of the gasoline before the step of receiving.

53. The system of claim 52 further comprising the step of promoting the flow of the mixture from the nozzles.

* * * * *